United States Patent [19]

Yoshimi et al.

[11] Patent Number: 4,861,403

[45] Date of Patent: Aug. 29, 1989

[54] METHOD OF FABRICATING A DOUBLE-TOOTHED BELT

[75] Inventors: Keiichi Yoshimi, Hyogo; Shigeo Goto, Himeji; Masaaki Asazuma, Hyogo, all of Japan

[73] Assignee: Mitsuboshi Belting Ltd., Kobe, Japan

[21] Appl. No.: 102,884

[22] Filed: Sep. 30, 1987

[51] Int. Cl.$^4$ .............................................. F16G 1/00
[52] U.S. Cl. .................................. 156/138; 156/141; 156/245; 264/255; 264/296; 264/326
[58] Field of Search ............... 156/137, 139, 140, 141, 156/245, 138; 425/28.1, 34.2, 339; 264/167, 255, 280, 296, 326

[56] References Cited

U.S. PATENT DOCUMENTS

| | | | |
|---|---|---|---|
| 2,831,359 | 4/1958 | Carle | 156/137 X |
| 3,078,206 | 2/1963 | Skura | 156/140 |
| 3,673,883 | 7/1972 | Adams | 74/233 |
| 3,897,291 | 7/1975 | Hoback et al. | 156/138 |
| 3,934,968 | 1/1976 | Cicognani | 425/28 B |
| 4,311,474 | 1/1982 | Standley | 156/137 X |
| 4,359,355 | 11/1982 | Stecklein et al. | 156/140 X |
| 4,369,160 | 1/1983 | Evgidi et al. | 425/28 B X |
| 4,395,298 | 7/1983 | Wetzel et al. | 156/137 |
| 4,414,047 | 11/1983 | Wetzel et al. | 156/138 |
| 4,575,445 | 3/1986 | Fujita et al. | 425/28 B X |
| 4,589,941 | 5/1986 | Tanaka et al. | 156/153 X |

FOREIGN PATENT DOCUMENTS 46-22101  3/1971  Japan.
58-12756  6/1976  Japan.

OTHER PUBLICATIONS

Standard Test Method for Rubber Property—Vulcanization Characteristics Using Oscillating Disk Cure Meter-ASMT Designation: D 2084-31, pp. 536-541.

*Primary Examiner*—Michael W. Bell
*Assistant Examiner*—David William Herb
*Attorney, Agent, or Firm*—Wood, Dalton, Phillips, Mason & Rowe

[57] ABSTRACT

A method of fabricating a rubber double-toothed belt wherein the unvulcanized rubber thereof is firstly heat treated so as to define a first toothed portion of the belt without substantial vulcanization thereof. The preform is then entrained about pulleys and a pair of heated molds engaged with both the toothed portion and the nontoothed outer portion of the belt to place the preform under pressure at a vulcanization temperature for sufficient time to cause the outer rubber portion of the preform to flow outwardly and define the outer teeth of the final belt concurrently with the vulcanization of the double-toothed belt construction. The parameters for controlling the heat treatment to provide the configurational retention without substantial vulcanization of the preform rubber are disclosed.

19 Claims, 4 Drawing Sheets

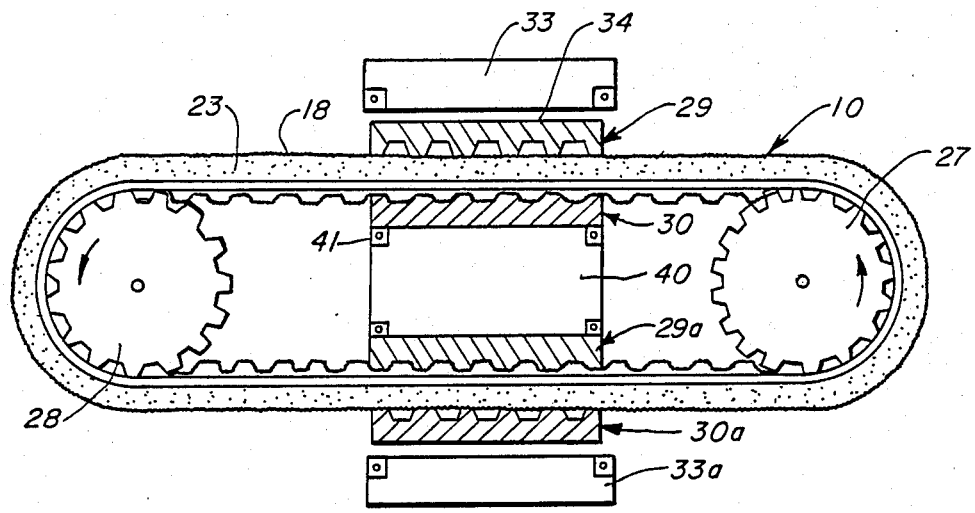
FIG. 3
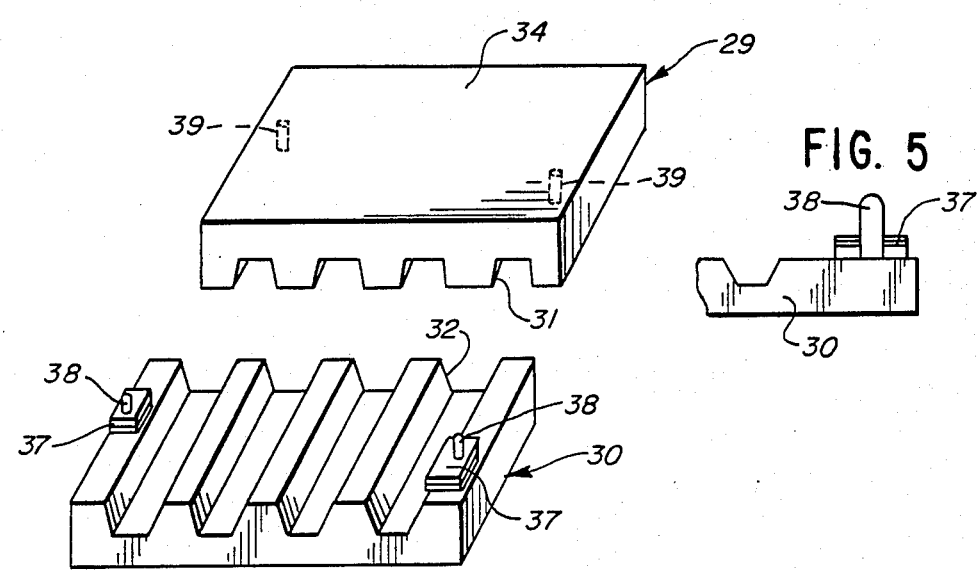
FIG. 5
FIG. 4

METHOD OF FABRICATING A DOUBLE-TOOTHED BELT

TECHNICAL FIELD

This invention relates to the forming of belts; such as timing belts and more specifically to the fabricating of double-toothed timing belts.

BACKGROUND ART

One method of forming double-toothed belts has been to injection mold the belt from a suitable material, such as polyurethane. Many applications, however, require the use of rubber and the injection molding process is not suitable for such belt manufacture.

One improved method of forming a double-toothed belt is illustrated in U.S. Pat. No. 4,589,941 of Tanaka et al., which patent is owned by the assignee hereof. As disclosed therein, a double-toothed timing belt is manufactured by forming a preform with teeth on one face thereof. The opposite face of the belt is provided with oppositely projecting teeth in accurate alignment with the firstly formed teeth of the preform by successive molding of pluralities of the opposite teeth to the outer face of the preform, with the preform entrained about a pair of adjustably spaced toothed pulleys. Accurate pitch line difference is maintained by providing shims between the mold and belt support during the molding of the plurality of second sets of teeth to the preform. The outer face of the belt is treated to define a bonding surface, such as by roughening thereof. An unvulcanized rubber insert is placed between the preform outer surface and an outer stretchable fabric layer.

DISCLOSURE OF THE INVENTION

The present invention comprehends an improved method of fabricating a double-toothed belt wherein the preform is partially molded to define a substantially unvulcanized body having an inner toothed portion and outer, nontoothed portion.

The partially molded preform is entrained about spaced toothed pulleys. Both the inner and outer surfaces of the preform are covered with fabric.

Teeth are formed in the outer portion of a limited portion of the preform and concurrently, vulcanization of the limited portion of the preform between a pair of upper and lower toothed molds is effected to form a fully vulcanized molded belt portion having upper and lower vulcanized and fabric-covered toothed portions. The vulcanized molded belt portion is advanced to bring a subsequent substantially unvulcanized portion of the preform between the upper and lower toothed molds, and this operation is repeated to completely form a vulcanized endless double timing belt having vulcanized teeth in each of the inner and outer portions the entire length of the belt.

The preform is formed by winding a first layer of stretchable fabric about an outer peripheral surface of a cylindrical toothed mandrel defined by a plurality of axially extending, circumferentially spaced grooves. A tensile cord is spirally wound thereabout and an unvulcanized sheet of rubber having a preselected thickness is wound thereabout.

A second layer of stretchable fabric is wound about the rubber layer. The thusly arranged layers of fabric and rubber sheet are heated under pressure in a mold to cause the rubber to flow into the grooves to form a partially molded, substantially unvulcanized preform having an inner toothed portion and an outer nontoothed portion covered by the inner and outer fabric layers respectively.

The invention comprehends such a method wherein the concurrent tooth formation and vulcanization is effected on a plurality of portions of the preform at the same time.

The invention comprehends the provision of molds having a width preselected to permit excess rubber to flow outwardly from therebetween so as to assure accurate uniform thickness of the belt.

The first and second layers of fabric may be formed of similar or dissimilar material, as desired. In the illustrated embodiment, the fabric is formed of nylon 6.

The fabric may have crimped weft yarns extending circumferentially of the mandrel so as to provide improved elasticity thereof.

The preform is heated to approximately 153° in effecting the partial molding thereof. The tensile strength of the preform thus formed is less than approximately 5% of the tensile strength of the final vulcanized belt.

The modulus of elasticity of the preform is less than approximately 5% of the modulus of elasticity of the vulcanized belt.

In the formation of the preform, a pressure of approximately 5 kg/cm$^2$ is applied.

In carrying out the vulcanization and double-toothed formation, a pressure of approximately 50 kg/cm$^2$ is provided.

The subjection of the material to heat and pressure in forming the preform is preferably for a period of less than 5 minutes. In the illustrated embodiment, the vulcanization step is carried out for at least approximately 25 minutes.

In the illustrated embodiment, the preform has a torque value of no greater than approximately 1.0 dN-m.

The method of fabricating a double-toothed belt of the invention is extremely simple and economical while yet providing a substantially improved, monolithic rubber body.

BRIEF DESCRIPTION OF THE DRAWING

Other features and advantages of the invention will be apparent from the following description taken in connection with the accompanying drawing wherein:

FIG. 3 is a side elevation illustrating a first step in the formation of the double-toothed belt from the preform of FIG. 2;

FIG. 4 is a perspective view illustrating in greater detail the upper and lower mold pressure plates of the apparatus of FIG. 3;

FIG. 5 is a fragmentary elevation illustrating the locating pin and spacers associated with the lower mold pressure plate.

BEST MODE FOR CARRYING OUT THE INVENTION

Figure 1:
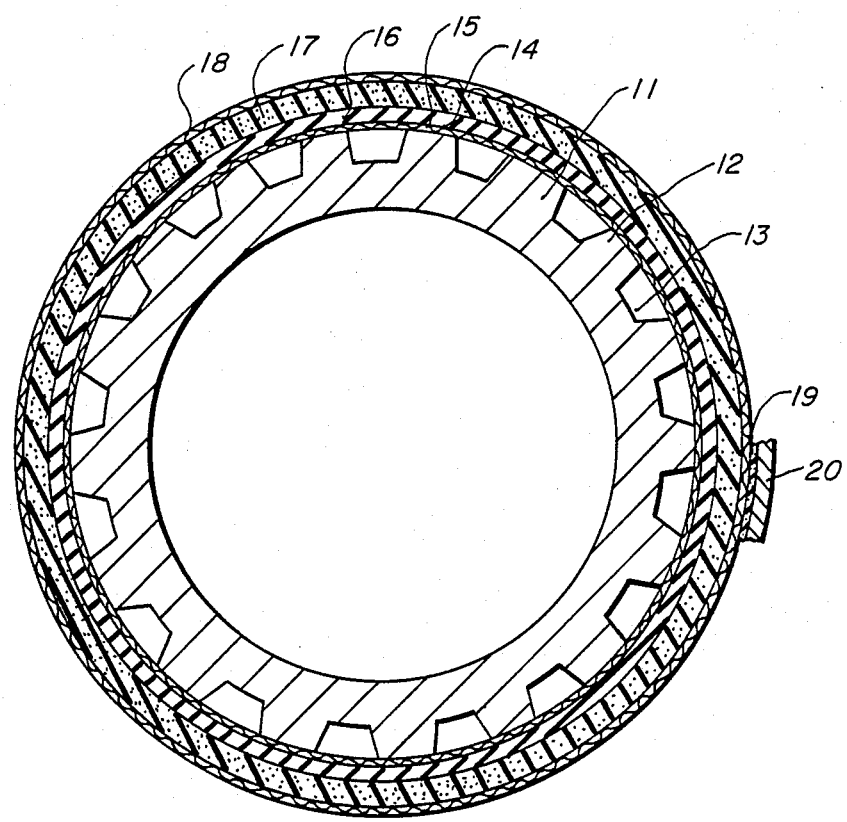
FIG. 1 is a transverse section illustration of the winding of an inner fabric, a tensile cord, a layer of rubber, and an outer fabric about a toothed mandrel.

In the illustrative embodiment of the invention as disclosed in the drawing, a preform generally designated 10 is formed on a mandrel 11 having a plurality of circumferentially alternating ribs and grooves 13.

A layer 14 of stretchable fabric is wrapped about the outer surface 15 of the ribs 11. Tensile cords 16 are spirally wound about the fabric 14, and an unvulcanized rubber sheet 17 have a predetermined thickness is wound about the tensile cords.

An outer stretchable fabric layer 18 is wound about the rubber sheet.

The layered arrangement is next subjected to a heat treatment by engaging a rubber sleeve 19 about the outer periphery of the outer fabric 18 and placing the entire assembly in an outer vulcanizing can. Steam under a pressure of 1 to 2 kg/cm is introduced into the can so as to cause plastic flow of the rubber sheet 17 inwardly past the tensile cords so as to urge the inner fabric 15 radially inwardly into the grooves 13 of the mandrel.

Before the rubber becomes vulcanized, the internal pressure and heat are reduced to prevent any further tendency to vulcanize the rubber.

The heat treatment of the rubber is preselected so as to cause the teeth to have sufficient body to maintain their configuration in a subsequent belt-forming step, while yet the physical parameters of the rubber are substantially that of unvulcanized rubber. Thus, more specifically, the heat treatment is restricted to maintain the tensile strength of the preform to below approximately 5% of the tensile strength of the vulcanized belt. Similarly, the modulus of elasticity of the preform is maintained less than approximately 5% of the modulus of elasticity of the vulcanized belt.

In the illustrated embodiment, the fabric 14 and fabric 18 are formed of similar materials, it being understood that any suitable elastic fabric may be utilized within the broad scope of the invention. In the illustrated embodiment, the fabric was formed of nylon 6, having a crimped weft extending circumferentially of the mandrel so as to provide improved controlled elasticity.

The tensile cord may be formed of any suitable material having low elongation and high tensile strength, such as glass fiber, aromatic polyamide, polyester, steel, etc.

Figure 2:
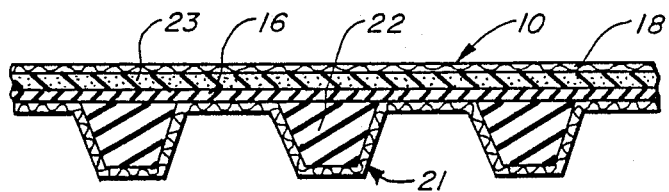
FIG. 2 is a fragmentary longitudinal section of the preform formed therefrom.
Figure 6:
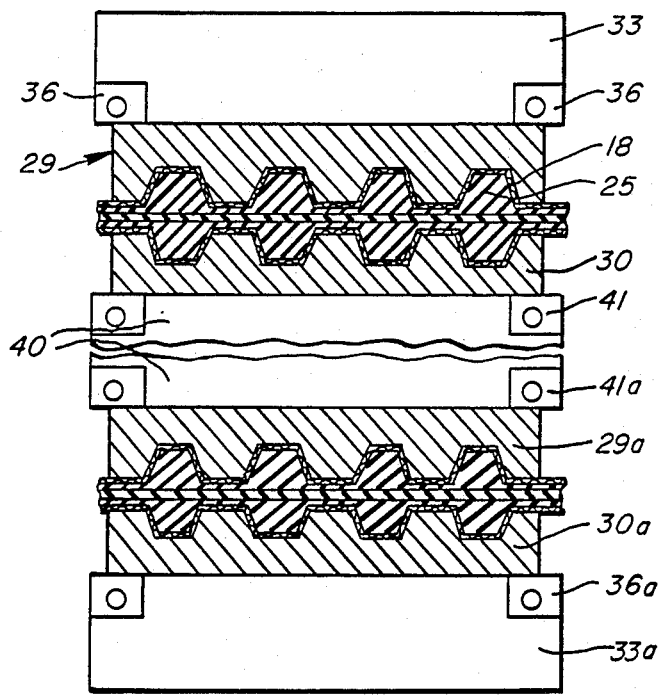
FIG. 6 is a fragmentary vertical section illustrating the vulcanized double-toothed portions of the belt between two pairs of such mold pressure plates.

The thickness of the rubber is preselected to provide a sufficient volume of rubber to form both the inner teeth and outer teeth. As shown in FIG. 2, the flow of the rubber in the heat treatment formation of the preform causes the inner fabric 14 to be urged against the outer surface of the mandrel both in the grooves and about the ribs so as to define a fabric cover 21 on the inner teeth 22 of the belt. The remaining rubber 23 is maintained outwardly of the tensile cords in the preform, as shown in FIG. 2.

The double-toothed belt 24 is formed from the preform, with the outer teeth 25 thereof being formed from the outer rubber 23 of the preform during the subsequent belt-forming operations. Thus, as shown in FIG. 3, the preform 10 is entrained about a pair of pulleys 27 and 28, with the teeth 22 engaging the grooves of the pulleys for controlled advance of the belt.

As further illustrated in FIG. 3, the formation of the vulcanized double-toothed construction of the belt is effected sequentially on successive portions of the belt disposed between a pair of mold plates 29 and 30. The teeth of the preform are received in the grooves 32 of the inner mold plate. The outer mold plate 29 is provided with a complementary opposed set of grooves 31 into which the outer rubber 23 flows in forming the outer teeth 25.

As further illustrated in FIG. 3, a second pair of mold plates 29a and 30a is provided for concurrently forming an opposite double-toothed portion of the preform.

The outer mold plate 29 is urged inwardly by a heated pressure plate 33 which presses against the outer surface 34 of the mold plate 29, urging it toward the inner mold plate 30. A similar heated pressure plate 33a acts against the mold plate 30a to urge it against the inner mold plate 29a.

The opposite lower corners of the heated pressure plate 33 are provided with cooling coils 36 for maintaining the portions of the outer mold 29 abutted thereby relatively cool so as to prevent extrusion of the outer rubber from between the mold plates 29 and 30.

Inner mold plate 30 is supported an inner heated pressure plate 40 having cooling coils 41 at the upper corners thereof in maintaining the opposite ends of the inner mold plate 30 cool and thereby preventing extrusion of the inner rubber outwardly therefrom during the final vulcanization process.

The lower pressure plate 33a is similarly provided with cooling coils 36a and the lower portion of the inner pressure plate 40 is provided with cooling coils 41a for preventing extrusion of fluidized rubber from the opposite ends of the mold plates 29a and 30a in a similar manner.

Suitable means are provided, not shown, for advancing the pulleys suitably to position a subsequent portion of the preform between the mold plates 29 and 30 and 29a and 30a upon completion of the vulcanization of each prior section of the belt until a complete vulcanized double-toothed belt is produced. At least one of the pulleys may be mounted for movement toward the opposite pulley so as to permit ready removal of the completed belt from the pulleys upon completion of the manufacture of the belt.

Figure 7:
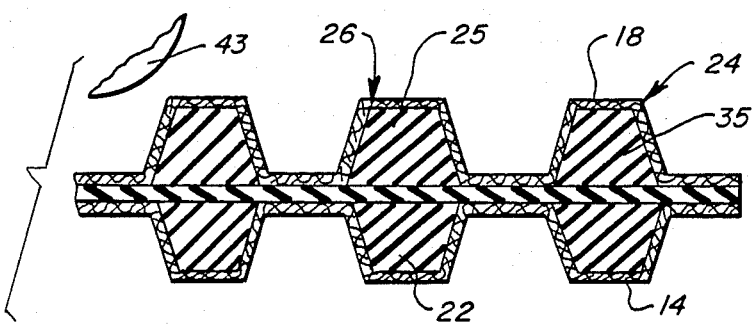
FIG. 7 is a fragmentary longitudinal section of the molded double-toothed belt in association with a cutting blade for severing the belt longitudinally into a plurality of narrower width belts.
Figure 8:
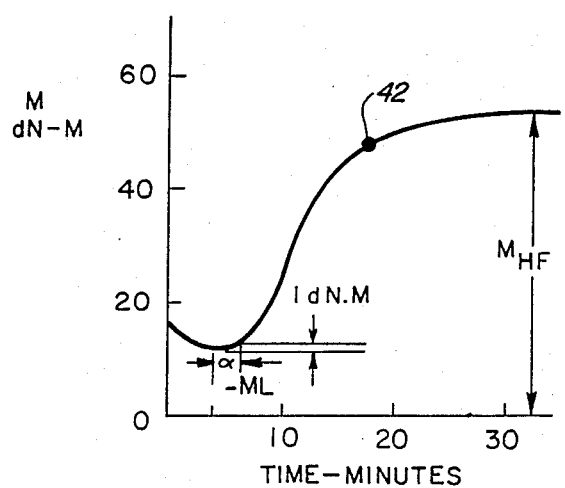
FIG. 8 is a graph of the vulcanization curve showing the relationship between the torque of the belt and the time of subjection thereof the vulcanization, temperature and pressure.
Figure 9:
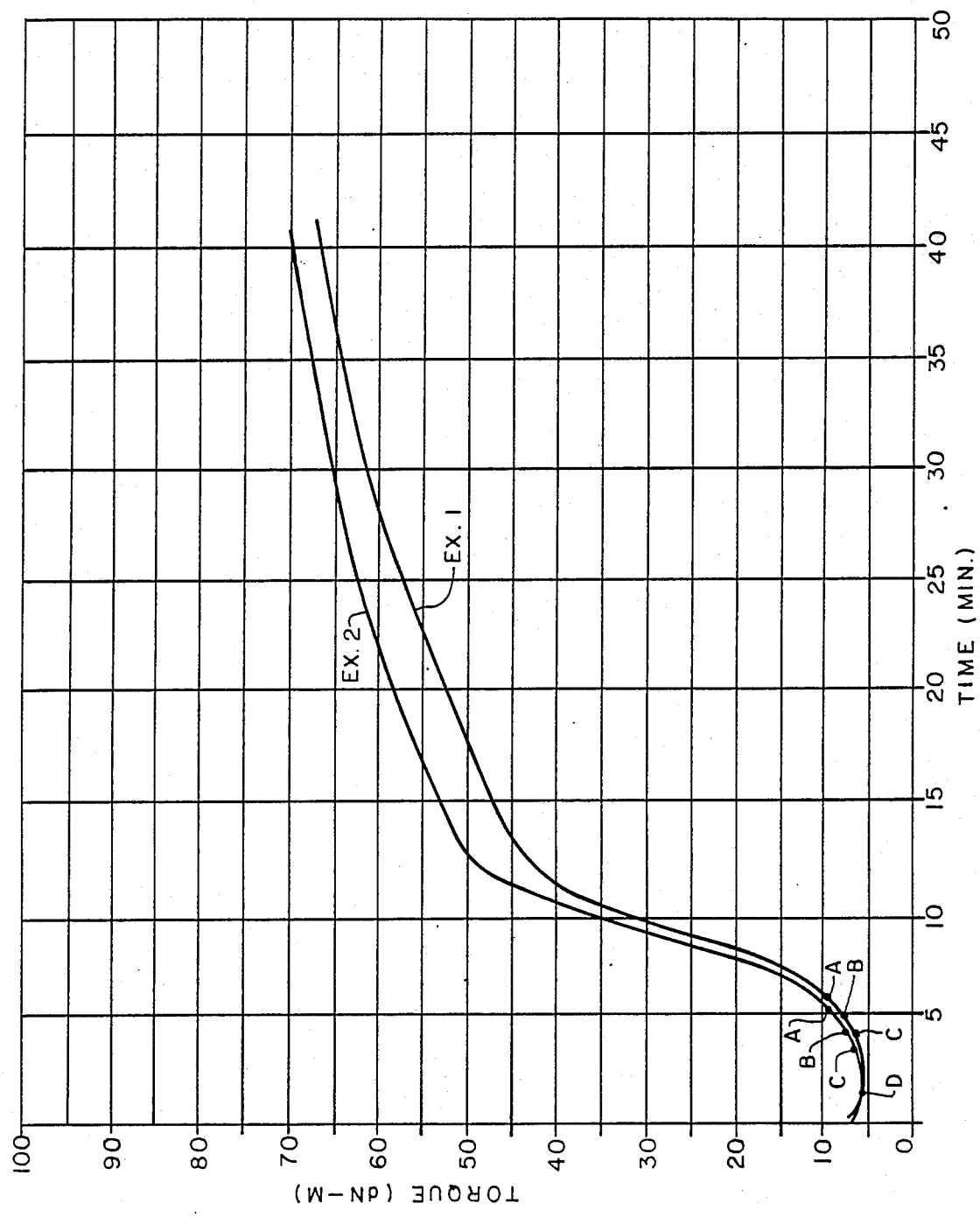
FIG. 9 is a graph illustrating the vulcanization curves of two test examples manufactured in accordance with the invention.

In the forming of the teeth 25, the fluidized unvulcanized rubber portion 23 urges the outer fabric 18 outwardly so as to define the outer cover 26 of the belt 24, as shown in FIG. 7.

The mold plates are illustrated in greater detail in FIGS. 4 and 5. Accurate location of the mold plates with respect to each other is effected by means of upstanding pins 38 on the inner mold plate received in complementary recesses 39 in the outer mold plate when the mold plates are brought together. Accurate spacing between the mold plates is effected by the provision of shims 37 fitted on the pins 38. The use of the shims permits an accurate, uniform PLD. In the illustrated embodiment, the shims may include one or more thick pins having a thickness of 2 to 3 mm., and one or more fine shims having a thickness of 0.5 mm.

The cooperation between the pins and recesses functions in the manner of a dowel to accurately maintain the outer mold plate grooves with respect to the inner mold plate grooves. In the illustrated embodiment, the outer and inner grooves are accurately aligned, it being understood that any desired arrangement of the outer grooves relative to the inner grooves may be provided within the broad scope of the invention.

The pressure plates may be heated by conventional heating means, such as steam, electric heaters, etc. Any suitable coolant may be used in circulating through the cooling coils and effecting the desired cooling of the opposite ends of the mold plate in the molding process.

The inner and outer teeth may have different pitches and tooth configurations as desired, and thus, the doubletoothed belt may be utilized not only for power transmission, timing, but also for conveying purposes.

The width of the belt 24 may be substantially greater than the width of the desired final toothed belts, permitting the concurrent manufacture of a plurality of narrow double-toothed belts. Thus, as shown in FIG. 7, a rotary knife 43 or the like may be utilized to separate the wide belt 24 into a plurality of narrower individual doubletoothed belts.

Two test belt constructions made in accordance with the invention were fabricated and tested as indicated below.

In the test belts, the fabric comprises nylon 6 fabric having crimped weft yarns bonded endlessly by hot melting. The mandrel had a circumference of 161.2 mm. and was provided with 100 teeth. The tensile cords comprise glass fiber cords wound under a tension of 1.5 kg/mm$^2$. The rubber sheet had a thickness of approximately 1.0 mm. The two test examples utilized a rubber mixture, as shown in Table 1 below. The outer fabric

TABLE 1

| Mixture | (Parts by weight) 1 | 2 |
| --- | --- | --- |
| Chloroprene | 100 | 100 |
| Stearic acid | 1.5 | 2.0 |
| MgO | 4.0 | 5.0 |
| Microcrystalline wax | 1.5 | 2.0 |
| N—isopropyl-N'—phenyl-P—phenylene diamine | 1.0 | 1.0 |
| Process oil | 12.0 | |
| DOP | | 25 |
| ZnO | 4.5 | 5.0 |
| Tetramethylenethiuran disulfide | 4.0 | 0.2 |
| Dipheylguanidine | 4.0 | |
| Sulfur | 4.0 | 0.2 |
| Diphenothiazyl disulfide | | 1.0 |
| Ground calcium carbonate | 21 | |
| Carbon black | 45 | 60 |

The preform was formed at a temperature of 153° C. and the vulcanization curve for each of the example belts were determined in accordance with ASTM designation D-2084-81 standard test method, using an oscillating disk cure meter. The time at which the belt rubber arrived at the torques represented by the values A, B, C, and D on the vulcanization curve were determined as indicated.

Upon completion of the formation of the preform, the preform was removed from the mandrel and the above described final powder tooth and vulcanization of the successive portions of the preform provide the complete double-toothed belt effect. In the outer tooth forming and vulcanization steps, the surface pressure was maintained at 50 kg/cm$^2$, and the temperature of the mold plates was maintained between 150° to 153° C. The vulcanization time was 25 minutes for each successive double-toothed belt formation.

As indicated in Table 2 below, the invention comprehends that the torque dN-m be prevented from increasing to more than 1.0 dN-m above the minimum torque ML.

TABLE 2

| Vulcanizing degree (position of vulcanization curve | Rubber mixture | Releasability of molded preform | Moldability of lower teeth of preform | Moldability of upper teeth of preform |
| --- | --- | --- | --- | --- |
| A (4.0 dN-m) | 1 | o | o | x |
| | 2 | o | o | x |
| B (2.2 dN-m) | 1 | o | o | x |
| | 2 | o | o | x |
| C (1.0 dN-m) | 1 | o | o | o |
| | 2 | o | o | o |
| D (Min. torque ML) | 1 | o | o | o |
| | 2 | o | o | o |

As shown in Table 2, when the vulcanization is permitted to occur so as to be more than 1.0 dN-m, moldability of the upper teeth cannot be satisfactorily effected because of the substantial vulcanization of the outer rubber material 23 of the preform. Thus, more specifically, the invention comprehends the subjection of the preform to a heat treatment which prevents effective vulcanization of the rubber while yet provides a sufficient configurational retention of the lower teeth so as to be suitably entrained with the pulleys 27 and 28 in effecting the sequential advance of the preform in effecting the sequential formation of the completed vulcanized double-toothed belt portion in forming the completed double-toothed belt.

By controlling the heat treatment thusly, the need for bonding a separate outer rubber portion to a preformed inner toothed portion is effectively eliminated, thereby permitting substantially facilitated manufacture and reduction in cost of the double-toothed belt. High accuracy in the location of the outer teeth relative to the inner teeth is readily effected by accurate control of the position of the inner and outer mold plates. Where different rubber blends are utilized, the vulcanization curves thereof may be readily determined and the heat treatment effected in conformity with the requirement of effectively preventing vulcanization so as to permit the ready formation of the outer teeth in the final outer tooth formation and vulcanization step.

The foregoing disclosure of specific embodiments is illustrative of the broad inventive concepts comprehended by the invention.

We claim:

1. A method of fabricating a double-toothed belt, comprising the steps of:
   (a) forming a belt preform with all components making up the completed double-toothed belt, said belt components consistent of an inner layer of a stretchable fabric, a tensile cord wound spirally thereabout, an unvulcanized body of rubber, and an outer layer of a second stretchable fabric, heating said belt preform to cause the formation of teeth which have sufficient body to maintain their configuration in the subsequent steps wherein the torque thereof increases by no more than approximately one dN-m above the minimum torque ML of said belt preform, whereby said fabric and rubber form a partially molded, substantially unvulcanized preform having an inner toothed portion and an outer nontoothed portion;

(b) entraining the preform toothed inner portion about a pair of axially spaced toothed pulleys;

(c) forming teeth in said outer portion of a limited portion of the preform and concurrently vulcanizing said limited portion of the preform between a pair of upper and lower toothed molds to form a vulcanized molded belt portion having upper and lower vulcanized toothed portions;

(d) advancing the vulcanized molded belt portion to bring a subsequent substantially unvulcanized portion of the preform between said pair of upper and lower toothed molds; and (e) repeating sequentially step (c) to completely form a vulcanized endless double timing belt having vulcanized teeth in each of said inner and outer portions the entire length of the belt.

2. The method of forming a double-toothed belt of claim 1 wherein step (c) is concurrently performed on a plurality of portions of said preform.

3. The method of forming a double-toothed belt of claim 1 wherein said outer teeth are aligned with said inner teeth.

4. The method of forming a double-toothed belt of claim 1 wherein said upper and lower toothed molds are caused to be spaced apart an accurately preselected distance during the carrying out of step (c).

5. The method of forming a double-toothed belt of claim 1 including the further step of (f) dividing said vulcanized belt lengthwise thereof to form a plurality of reduced width double timing belts therefrom.

6. The method of forming a double-toothed belt of claim 1 wherein said molds have a width preselected to permit excess rubber to flow outwardly from therebetween in carrying out step (c) whereby the belt portion between said molds is of accurately uniform thickness.

7. The method of forming a double-toothed belt of claim 1 wherein said first and second layers of fabric are formed of similar material.

8. The method of forming a double-toothed belt of claim 1 wherein said first and second layers of fabric are formed of nylon 6.

9. The method of forming a double-toothed belt of claim 1 wherein said first and second layers of fabric have crimped weft yarns extending circumferentially of said mandrel.

10. A method of fabricating a double-toothed belt, comprising the steps of:

(a) winding a first layer of stretchable fabric about an outer peripheral surface of a cylindrical toothed mandrel defined by a plurality of axially extending circumferentially spaced grooves;

(b) winding tensile cord spirally thereabout;

(c) winding an unvulcanized sheet of rubber having a preselected thickness thereabout;

(d) winding a second layer of stretchable fabric thereabout to define a belt perform, said first and second layers of fabric, the tensile cord, and rubber sheet defining said belt preform being the only components defining the entire completed double-toothed belt;

(e) heating the thusly arranged layers of fabric and rubber sheet under pressure in a mold to cause the rubber to flow into the grooves to form teeth which have sufficient body to maintain their configuration in the subsequent steps wherein the torque thereof increases by no more than approximately one dN-m above the minimum torque ML of said belt preform, said heated preform comprising a partially molded substantially unvulcanized preform having an inner toothed portion and an outer nontoothed portion;

(f) removing said preform from said mold;

(g) entraining the preform toothed inner portion about a pair of axially spaced toothed pulleys;

(h) forming teeth in said outer portion of a limited portion of the preform and concurrently vulcanizing said limited portion of the preform between a pair of upper and lower toothed molds to form a vulcanized molded belt portion having upper and lower vulcanized toothed portions;

(i) advancing the vulcanized molded belt portion to bring a subsequent substantially unvulcanized portion of the preform between said pair of upper and lower toothed molds; and (j) repeating sequentially step (h) to completely form a vulcanized endless double timing belt having vulcanized teeth in each of said inner and outer portions the entire length of the belt.

11. The method of forming a double-toothed belt of claim 10 wherein said preform is heated to approximately 153° C. in carrying out step (e).

12. The method of forming a double-toothed belt of claim 10 wherein the tensile strength of the preform is less than approximately 5% of the tensile strength of the vulcanized belt.

13. The method of forming a double-toothed belt of claim 10 wherein the modulus of elasticity of the preform is less than approximately 5% of the modulus of elasticity of the vulcanized belt.

14. The method of forming a double-toothed belt of claim 10 wherein the pressure applied in carrying out step (e) is approximately 5 kg/cm$^2$.

15. The method of forming a double-toothed belt of claim 10 wherein the pressure applied by the molds in carrying out step (h) is approximately 50 kg/cm$^2$.

16. The method of forming a double-toothed belt of claim 10 wherein said step (e) is conducted for less than 5 minutes.

17. The method of forming a double-toothed belt of claim 10 wherein said step (h) is conducted for at least 25 minutes.

18. A method of fabricating a double-toothed belt of the type having inner and outer teeth, said method comprising the steps of:

(a) forming a belt preform with components defining the inner teeth and the outer teeth on the completed double-toothed belt;

(b) heating said belt preform to cause the formation of teeth which have sufficient body to maintain their configuration in the subsequent steps wherein the torque thereof increases by no more than approximately one dN-m above the minimum torque ML of said belt preform, whereby said preform components form a partially molded, substantially unvulcanized preform having an inner toothed portion and an outer nontoothed portion;

(c) entraining the preform toothed inner portion about a pair of axially spaced toothed pulleys;

(d) forming teeth in said outer portion of a limited portion of the preform and concurrently vulcanizing said limited portion of the preform between a pair of upper and lower toothed molds to form a vulcanized molded belt portion having upper and lower vulcanized toothed portions;

(e) advancing the vulcanized molded belt portion to bring a subsequent substantially unvulcanized portion of the preform between said pair of upper and lower toothed molds; and (f) repeating sequentially step (d) to completely form a vulcanized endless double timing belt having vulcanized teeth in each of said inner and outer portions the entire length of the belt.

19. A method of fabricating a double-toothed belt comprising the steps of:

(a) forming a belt preform with all components defining the completed double-toothed belt;

(b) heating said belt preform to cause the formation of teeth which have sufficient body to maintain their configuration in the subsequent steps wherein the torque thereof increases by no more than approximately one dN-m above the minimum torque ML of said belt preform, whereby said preform components form a partially molded, substantially unvulcanized preform having an inner toothed portion and an outer nontoothed portion;

(c) entraining the preform toothed inner portion about a pair of axially spaced toothed pulleys;

(d) forming teeth in said outer portion of a limited portion of the preform and concurrently vulcanizing said limited portion of the preform between a pair of upper and lower toothed molds to form a vulcanized molded belt portion having upper and lower vulcanized toothed portions;

(e) advancing the vulcanized molded belt portion to bring a subsequent substantially unvulcanized portion of the preform between said pair of upper and lower toothed molds; and (f) repeating sequentially step (d) to completely form a vulcanized endless double timing belt having vulcanized teeth in each of said inner and outer portions the entire length of the belt.

* * * * *